United States Patent
Danilov et al.

(10) Patent No.: US 7,683,822 B2
(45) Date of Patent: Mar. 23, 2010

(54) METHOD AND SYSTEM FOR REMOTELY DETECTING METAL ITEMS

(76) Inventors: Nikolay Yurievich Danilov, UL. Isakovskogo, 14, Korp 1, KV. 279, 123181 Moscow (RU); Vladimir Avenirovich Kropotov, UL. Vilnusskaya, 4, KV. 571, 117574 Moscow (RU)

( * ) Notice: Subject to any disclaimer, the term of this patent is extended or adjusted under 35 U.S.C. 154(b) by 0 days.

(21) Appl. No.: 12/006,215

(22) Filed: Dec. 31, 2007

(65) Prior Publication Data

US 2008/0106454 A1 May 8, 2008

(51) Int. Cl.
G01S 7/292 (2006.01)
G01S 13/04 (2006.01)
G01S 13/88 (2006.01)
G01S 13/00 (2006.01)

(52) U.S. Cl. .............. 342/22; 342/27; 342/89; 342/90; 342/175; 342/195

(58) Field of Classification Search ............ 342/21, 342/22, 27, 28, 73, 82, 83, 85, 118, 128–133, 342/146, 147, 175, 188–197, 52–55, 89, 342/90, 176–186

See application file for complete search history.

(56) References Cited

U.S. PATENT DOCUMENTS

| | | | | |
|---|---|---|---|---|
| 3,967,282 A | * | 6/1976 | Young et al. | 342/22 |
| 4,062,010 A | * | 12/1977 | Young et al. | 342/21 |
| 5,541,605 A | * | 7/1996 | Heger | 342/22 |
| 5,543,799 A | * | 8/1996 | Heger | 342/21 |
| 5,680,048 A | * | 10/1997 | Wollny | 342/22 |
| 5,767,679 A | * | 6/1998 | Schroder | 342/22 |
| 5,854,603 A | * | 12/1998 | Heger | 342/21 |
| 5,883,591 A | * | 3/1999 | McEwan | 342/22 |
| 5,896,102 A | * | 4/1999 | Heger | 342/21 |
| 5,905,455 A | * | 5/1999 | Heger et al. | 342/22 |

(Continued)

FOREIGN PATENT DOCUMENTS

RU 2165094 4/2001

(Continued)

*Primary Examiner*—Bernarr E Gregory
(74) *Attorney, Agent, or Firm*—Collard & Roe, P.C.

(57) ABSTRACT

The invention relates to the methods and systems for remotely detecting metal items, for example, weapons, concealed in cloths or belongings and may be used in security complexes. The proposed system contains a phased antenna array 1 radiating a continuous frequency-modulated ultra high or super high frequency signal and scanning a controlled space, a receiver 2 of reflected signals, a processor 3, a display 4, and a video camera 5. The processor 3 detects a potentially threatening metal item during any scanning period other than the initial period if one of the two comparison conditions holds for some radiation direction: $A_i > A_0 + \Delta$ or $A_i < A_0 - \Delta$ where $A_i$ is the code of the signal amplitude at the output of the receiver 2 of the reflected signal during any scanning period following the initial period for some radiation direction; $A_0$ is the code of the signal amplitude at the same output for the same direction of radiation during the initial scanning period when no potentially threatening metal items are allowed in the scanning sector, and $\Delta > 0$ is the tolerance of the deviation of the code $A_0$ taking into account permissible changes in the reflected signal. Advantages of the invention: extension of the range of permissible distances to detected metal items, increased noise immunity, simplified operator activities, and increased scanning rate and reliability.

2 Claims, 1 Drawing Sheet

U.S. PATENT DOCUMENTS

| | | | |
|---|---|---|---|
| 6,002,357 A * | 12/1999 | Redfern et al. ................. | 342/22 |
| 6,359,582 B1 | 3/2002 | MacAleese et al. | |
| 6,480,141 B1 | 11/2002 | Toth et al. | |
| 6,501,414 B2 * | 12/2002 | Arndt et al. .................... | 342/22 |
| 6,703,964 B2 * | 3/2004 | McMakin et al. ............. | 342/22 |
| 6,720,905 B2 | 4/2004 | Levitan et al. | |
| 6,765,527 B2 * | 7/2004 | Jablonski et al. ............ | 342/193 |
| 6,791,487 B1 * | 9/2004 | Singh et al. ................... | 342/22 |
| 6,856,271 B1 * | 2/2005 | Hausner ...................... | 342/22 |
| 6,876,322 B2 * | 4/2005 | Keller .......................... | 342/22 |
| 6,937,182 B2 * | 8/2005 | Lovberg et al. ............... | 342/22 |
| 7,167,123 B2 * | 1/2007 | Hausner et al. ............... | 342/22 |
| 7,194,236 B2 * | 3/2007 | Lovberg et al. ............... | 342/27 |
| 7,248,204 B2 * | 7/2007 | Lovberg et al. ............... | 342/22 |
| 7,265,551 B2 * | 9/2007 | Kellermann ................... | 342/22 |
| 7,310,060 B2 * | 12/2007 | Stilwell et al. ................ | 342/22 |
| 7,319,233 B2 * | 1/2008 | Nelson ......................... | 342/22 |
| 7,333,045 B1 * | 2/2008 | Aomori et al. ................ | 342/22 |
| 7,365,672 B2 * | 4/2008 | Keller et al. .................. | 342/22 |
| 7,385,549 B2 * | 6/2008 | Lovberg et al. ............... | 342/22 |
| 7,415,244 B2 * | 8/2008 | Kolinko et al. ................ | 342/27 |
| 7,432,846 B2 * | 10/2008 | Martin et al. .................. | 342/22 |
| 7,450,052 B2 * | 11/2008 | Hausner et al. ............... | 342/22 |
| 2002/0175849 A1 * | 11/2002 | Arndt et al. .................... | 342/22 |
| 2003/0179126 A1 * | 9/2003 | Jablonski et al. .............. | 342/22 |
| 2004/0041724 A1 | 2/2004 | Levitan et al. | |
| 2004/0056790 A1 * | 3/2004 | Lovberg et al. ............... | 342/22 |
| 2004/0080448 A1 * | 4/2004 | Lovberg et al. ............... | 342/22 |
| 2004/0140924 A1 * | 7/2004 | Keller et al. .................. | 342/22 |
| 2004/0174289 A1 * | 9/2004 | Singh et al. ................... | 342/22 |
| 2004/0263379 A1 * | 12/2004 | Keller .......................... | 342/22 |
| 2005/0093733 A1 * | 5/2005 | Lovberg et al. ............... | 342/22 |
| 2005/0099330 A1 * | 5/2005 | Hausner et al. ............... | 342/22 |
| 2006/0017605 A1 * | 1/2006 | Lovberg et al. ............... | 342/22 |
| 2006/0284758 A1 * | 12/2006 | Stilwell et al. ................ | 342/22 |
| 2007/0001895 A1 * | 1/2007 | Kolinko et al. ................ | 342/22 |
| 2007/0052576 A1 * | 3/2007 | Hausner et al. ............... | 342/22 |
| 2007/0152866 A1 * | 7/2007 | Nelson ......................... | 342/22 |

FOREIGN PATENT DOCUMENTS

| | | |
|---|---|---|
| RU | 2206107 | 6/2001 |
| RU | 2251125 | 4/2005 |

* cited by examiner

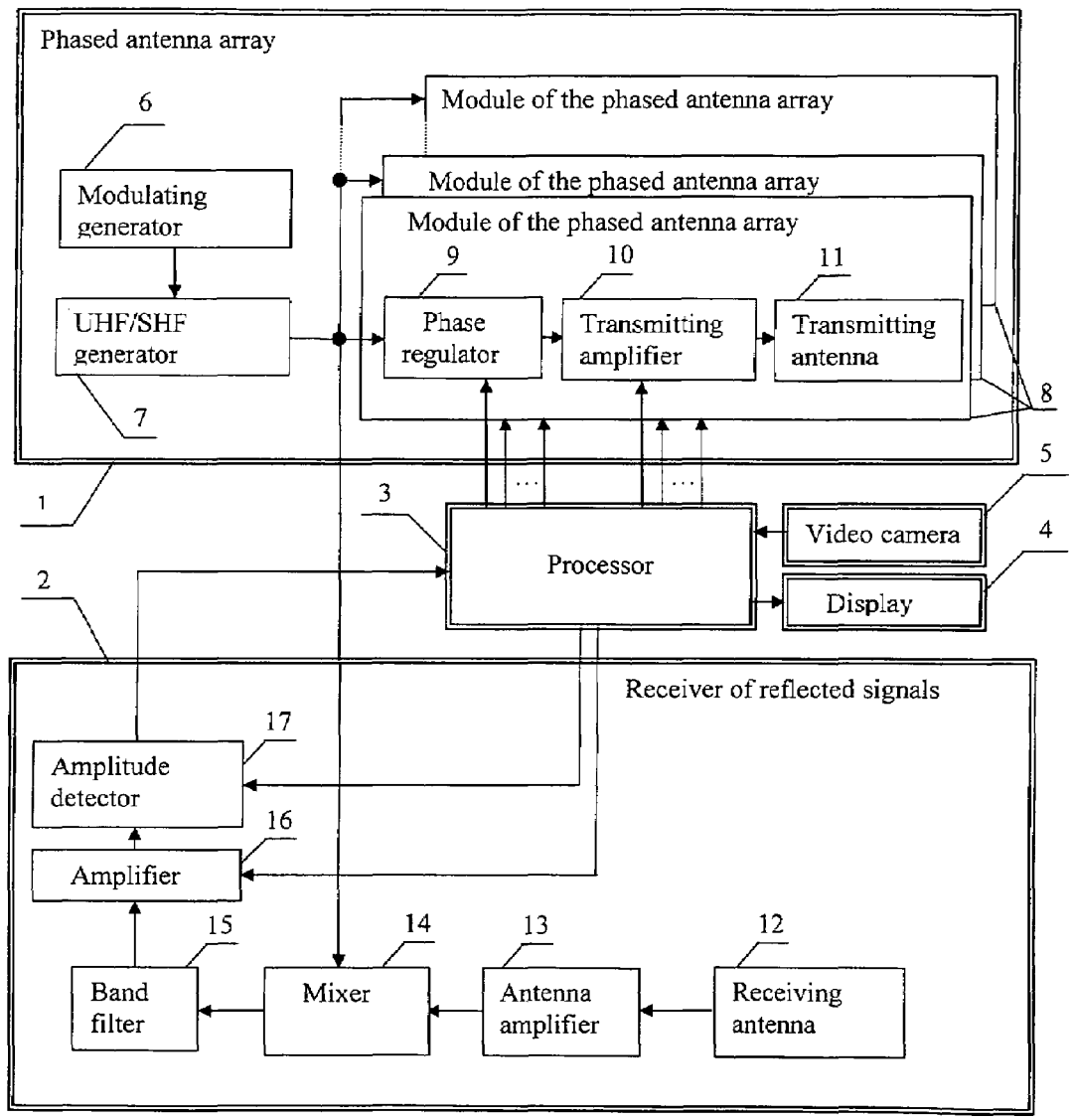

METHOD AND SYSTEM FOR REMOTELY DETECTING METAL ITEMS

FIELD OF THE INVENTION

The invention relates to the measuring technique or, more specifically, methods and systems for remotely detecting potentially threatening metal items, for example, weapons, and for visually observing the objects containing them.

The invention may be used in security complexes, airports, stadiums, and other public gathering sites for detecting weapons concealed in clothes or belongings and for observing the individuals concealing the weapons.

BACKGROUND OF THE INVENTION

The proposed method and system for detection of metal items belong to the methods and devices based on reflection of electromagnetic waves (Int.Class$^7$ G01S13).

Known are methods and systems for remotely detecting metal item based on reflection of electromagnetic waves that do not use automatic scanning of the controlled space by electromagnetic radiation. Such systems comprise transmitting and receiving antennas, transmitting and receiving electronic apparatuses connected respectively to the said antennas, a processor connected to the output of the said receiving apparatus, and a display connected to a processor (see U.S. Pat. No. 6,359,582 of 1997, U.S. Class 342/22 and U.S. Pat. No. 6,480,141 of 2001, U.S. Class 342/22). The method implemented in these systems employs a fixed direction of electromagnetic wave radiation, which is determined by the directivity diagram of the transmitting antenna. A disadvantage of this method and the systems implementing it is that radiation should be manually directed to potentially suspicious objects, since the direction of electromagnetic-wave radiation in such systems is fixed. Another disadvantage of these systems is that they do not display in a visual form the zone of the system operations and activities of the objects located within the zone (for example, the people located within the zone), which contain concealed metal items to be detected. This disadvantage is due to the fact that these systems do not incorporate a video camera.

The prototypes of the proposed method and system are the method and system for remotely detecting metal items, for example, weapons, described in the U.S. Pat. No. 6,720,905 of 2002, U.S. Class 342/22 (Methods and Apparatus for Detecting Concealed Weapons). In the above patent, these prototypes are called the method and the system for detecting concealed weapons as well as the method and the system for detecting a threat.

The prototype of the method comprises scanning the controlled space, which may contain potentially threatening metal items, with electromagnetic radiation and detecting the presence of such items if the output signal from the receiver of the reflected signal exceeds a preset threshold.

The prototype of the system comprises a unit for scanning some controlled space, which may contain potentially threatening metal items, with electromagnetic radiation, a receiver of the reflected signal connected to this unit, a display, a video camera, and a processor connected to them, which records detection of a metal item if the output signal from the said receiver exceeds a preset threshold.

In the prototype of the system, the scanning unit is designed as a radar with a lens antenna that scans space owing to mechanical motion. Even though the aforementioned patent does not disclose the radar design, clearly, the radar as such also contains electronic transmitting equipment connected to the said antenna and a receiver of the reflected signal connected to a processor. In the prototype system, the signal of detection of a metal item is formed if the amplitude of the output signal of the receiver of the reflected signal exceeds a preset threshold. The said threshold may be set either as a result of calculations or manually by the user/operator.

The prototype of the method and the prototype of the system have the following disadvantages.

Two disadvantages are related to the use (in the case of the prototype of the system, in the system radar) of pulse or continuous electromagnetic radiation. If pulse radiation is employed, detection of metal items may be hindered at small distances (less than 4 m) owing to the small time (less than 10 ps) needed for electromagnetic waves to propagate through this distance and even shorter duration of the reflected signal. If continuous radiation is used, amplitude detection of non-modulated and amplitude-modulated reflected signals and recording of metal-item detection based on the excess of the output-signal amplitude over a preset amplitude, which are employed in the radar, indicate that the prototypes of the method and the system are characterized by low noise immunity when detecting metal items.

Another disadvantage is that the prototypes of the method and the system prototypes do not distinguish potentially threatening metal items from the metal items that are not potentially threatening and are located in the scanning sector in a stationary way, as, for example, metal partitioning barriers.

The disadvantages of the prototype of the system also consist in the low scanning rate and insufficient reliability of the lens antenna owing to necessity to mechanically move the antenna to change the radiation direction (directivity diagram).

SUMMARY OF THE INVENTION

The present invention aims to develop the method and the system for remotely detecting metal items, for example, weapons, based on reflection of electromagnetic waves, which would ensure advantages as compared to the prototype by attaining concurrently the following goals:
  enhancement of noise immunity when detecting metal items;
  disabling of the record of the event of detection of metal items that are located in the scanning sector in a stationary way and are not potentially threatening, for example, partitioning barriers;
  extension of the range of permissible distances between the proposed systems and the metal items to be detected owing to a decrease in the minimal permissible distance;
  increase in the rate of scanning of the controlled space possibly containing metal items;
  enhancement of the reliability of the system for detecting metal items.

The controlled space is the space under surveillance.

These advantages are attained owing to the proposed method for remotely detecting metal items, for example, weapons, involving scanning of the controlled space, which may contain potentially threatening metal items, with electromagnetic radiation, detection of the presence of such items using the output signal of the receiver of the reflected signal, and performance of the following operations:
  scanning the controlled space that may contain potentially threatening metal items with electromagnetic radiation;
  detecting the presence of those items based on the output signal of the receiver of the reflected signal;

employing the continuous frequency-modulated ultra high or super high frequency signal as electromagnetic radiation;

storing, in the processor, the codes of the output signals of the receiver of the reflected signal for all radiation directions during the initial period of scanning when no potentially threatening metal items are allowed in the scanning sector;

recording, in the processor, the event of detection of potentially threatening metal items during subsequent scanning periods if one of the two comparison conditions holds for some radiation direction:

$$A_i > A_0 + \Delta \text{ or } A_i < A_0 - \Delta,$$

where $A_i$ is the code of the amplitude of the signal at the output of the receiver of the reflected signal during any scanning period after the initial one for any of the radiation directions;

$A_0$ is the code of the amplitude of the signal at the output of the receiver of the reflected signal during the initial scanning period for the same radiation direction for which the code $A_i$ was obtained;

$\Delta > 0$ is the tolerance of the deviation of the code $A_0$ accounting for permissible changes in the reflected signal.

The same advantages are also attained owing to the fact that the proposed system for remotely detecting metal items, for example, weapons, comprises:

a unit for scanning the controlled space, in which potentially threatening metal items may be located, with electromagnetic radiation;

a receiver of the reflected signal connected to this unit;

a processor connected to this receiver;

a display and video camera connected to the processor;

wherein the scanning unit is designed as a phased antenna array radiating a continuous frequency-modulated super high or ultra high frequency signal and the control inputs of the array are connected to the processor outputs;

wherein the processor records to its memory the codes of the amplitudes of the output signals of the receiver of the reflected signal for all radiation directions at the initial scanning period when the no potentially threatening metal items are allowed in the scanning sector and records the event of detection of potentially threatening metal items during subsequent scanning periods if for some radiation direction one of the two comparison conditions holds:

$$A_i > A_0 + \Delta \text{ or } A_i < A_0 - \Delta,$$

where $A_i$ is the code of the amplitude of the signal at the output of the receiver of the reflected signal during any scanning period after the initial one for any of the radiation directions;

$A_0$ is the code of the amplitude of the signal at the output of the receiver of the reflected signal during the initial scanning period for the same radiation direction for which the code $A_i$ was obtained;

$\Delta > 0$ is the tolerance of the deviation of the code $A_0$ accounting for permissible changes in the reflected signal (this tolerance may be set by the user/operator similarly to the way the threshold is set in the prototype).

Enhanced noise immunity when detecting metal items is attained in the proposed method and the system by the use of radiation and reception of a continuous frequency-modulated super high or ultra high frequency signal and by the described above procedure of the detection of metal items.

Such procedure for the detection of metal items in the proposed method and system makes it possible not to record the event of detection of metal items that are located in the scanning sector in a stationary way but are not potentially threatening. Metal partitioning barriers are examples of such items. Since the event of the detection of such items is not recorded, they may be excluded from the analysis of the detected metal items and, thus, activities of the operator watching the objects containing detected metal items on a display screen are simplified.

The extension of the range of permissible distances between the proposed system and the metal items being detected owing to a decrease in the minimal permissible distance is attained in the proposed system and the method by the use in the system and the method of radiation and reception of the continuous frequency-modulated super high and ultra high frequency signal. The minimal permissible distance for detection of metal items in the proposed system is 10 cm while in the prototype using pulse radiation this distance is over 4 m.

An increase in the scanning rate and reliability is attained in the proposed system owing to the design of the scanning unit as a phased antenna array whose control inputs are connected to the processor output.

BRIEF DESCRIPTION OF THE DRAWING

The FIG. 1 shows the functional flowchart of the proposed system.

DETAILED DESCRIPTION

Description of the Proposed System

The present invention (the method and the system) may be implemented using the system whose functional flowchart is shown in the FIGURE.

The proposed system contains a phased antenna array 1 radiating a continuous frequency-modulated super high or ultra high frequency signal, a receiver of reflected signals 2, a processor 3, a display 4, and a video camera 5.

Ultra high frequency (UHF) is known to be characterized by the range of frequencies 300-3000 MHz and the super high frequency (SHF) by the range of frequencies 3-30 GHz (see, for example, the glossary of the Alliance for Telecommunications Industry Solutions, 2000, approved by the American National Standards Institute. The antenna array 1 radiates a signal belonging to the indicated UHF or SHF range.

The phased antenna array 1 contains a modulating generator 6, a UHF/SHF generator 7 whose input is connected to the output of the generator 6 and a set of modules 8 of the phased antenna array 1.

The generator 6 is used for generation of a modulated continuous signal having a constant frequency and the UHF/SHF generator 7 is intended for generation of the continuous frequency-modulated ultra high or super high frequency signal.

Each module 8 of the phased antenna array 1 consists of a phase regulator 9 (also called the phase shifter), a transmitting amplifier 10, and a transmitting antenna 11 connected to the output of the amplifier. The first inputs of the regulators 9 are combined and used as a common input of all modules 8 connected to the output of the UHF/SHF generator 7.

The second input of the regulator 9 is used for regulating the phase and the second input of the transmitting amplifier 10 is intended for regulation of the amplification gain. The said second inputs of the phase regulator 9 and the transmitting amplifier 10 of all modules 8 are control inputs of the phased antenna array 1 connected to the outputs of the processor 3.

The transmitting antennas 11 are designed to be located at an equal distance from each other in the plane perpendicular to the axial direction of radiation. The minimal number of the modules 8 in the phased antenna array 1 needed to form highly directional (or, in other words, narrow-beam) electromagnetic radiation is four.

The receiver 2 of the reflected signal contains a receiving antenna 12 and a circuit connected to its output, which consists of an antenna amplifier 13, a mixer 14, a band filter 15, an amplifier 16, and an amplitude detector 17 whose output is connected to the processor 3. The first input of the mixer 14 is connected to the output of the antenna amplifier 13 and the second output of the said mixer is connected to the output of the phased antenna array 1 used for sending the output signal of the UHF/SHF generator 7. The first input of the amplifier 16 is connected to the output of the filter 15 and the second, control, input of the amplifier 16 is connected with the output of the processor 3 serving for regulation of the amplification gain of the said amplifier. The amplitude detector 17 is intended for picking out the amplitude of the output signal of the amplifier 16. The amplitude detector 17 may be implemented, for example, as a peak amplitude detector, the control input of which is connected to the output of the processor 3.

The display 4 is connected to the output of the processor 3 and the video camera 5 is connected to the input of the processor 3.

The processor 3 performs the following functions:
- formation of the signals controlling the phase regulators 9 for scanning a certain controlled space with highly directional radiation of the phased antenna array 1;
- formation of the signals controlling the transmitting amplifiers 10, the amplifier 16, and the peak amplitude detector 17;
- record of the event of detection of a potentially threatening metal item and record of the radiation direction in which such item was found;
- formation of the coordinates specifying location of the detected metal items determined on the basis of the radiation direction along which that item was found;
- reception of a video image of the scanned sector from the video camera 5;
- superimposition of the video image of the scanned sector and coordinates of the potentially threatening metal item on the screen of the display 4.

With the purpose of the subsequent detection of metal items, the processor 3 records the codes $A_0$ of the amplitudes of the signals of the receiver 2 for all radiation directions during the initial (0-th) scanning period when no threatening metal items are allowed in spatial sector being scanned.

The processor 3 records the event of detection of a metal item during any i-th (i>0) scanning period that follows the initial period if, for some radiation direction, any of the two comparison conditions holds:

$$A_i > A_0 + \Delta \quad (1),$$

or $$A_i < A_0 - \Delta \quad (2),$$

where $A_i$ is the code of the amplitude of the signal at the output of the receiver of the reflected signal during any scanning period after the initial one for any of the radiation directions;

$A_0$ is the code of the amplitude of the signal at the output of the receiver of the reflected signal during the initial scanning period for the same radiation direction for which the code $A_i$ was obtained;

$\Delta > 0$ is the tolerance of the deviation of the code $A_0$ accounting for permissible changes in the reflected signal (this tolerance may be set by the user/operator similarly to the way the threshold is set in the prototype).

Conditions (1) and (2) follow from continuity of the radiation from the phased antenna array 1. Condition (1) holds if, for some radiation direction, the phase of the signal reflected during the 0-th scanning period is the same as the phase of a signal reflected during the i-th (i>0) scanning period. Condition (2) holds if, for some radiation direction, the phase of the signal reflected during the 0-th scanning period is opposite to the phase of a signal reflected during the i-th (i>0) scanning period.

Description of the Operations of the Proposed System

The proposed system operates as follows.

The phased antenna array 1 generates highly directional electromagnetic radiation by which it scans some space called a spatial scanning sector or a scanning sector or a scene. In the scanning sector, the objects are located that may contain potentially threatening metal items and the metal items that are not potentially threatening. The direction of highly directional electromagnetic radiation is changed for scanning purposes within the scanning sector using the control signals of the processor 3 sent to the control inputs of the phase antenna array 1, namely, to the second inputs of the phase regulators 9 and the transmitting amplifiers 10 of all the units 8.

The modulating generator 6 generates a continuous signal having a constant frequency that modulates the output signal of the UHF/SHF generator 7. The continuous frequency-modulated ultra high or super high frequency output signal of the UHF/SHF generator 7 is sent to the inputs of all the modules 8 of the phased antenna array 1. In each module 8, the phase of the said signal is regulated by the regulator 9 and the amplitude of the said signal is regulated by the amplifier 10. The continuous signal from the output of the transmitting amplifier 10 in each module 8 is radiated with the transmitting antenna 11. The electromagnetic waves radiated by the antennas 11 are summed in the scanning sector and form highly directional radiation, the direction of which may be changed owing to the change of the phase of the output signal of the UHF/SHF generator 7 in the phase regulators 9.

If a metal item is present in the scanning sector, electromagnetic radiation reflects from the said item and the reflected signal is received by the receiver 2. In the receiver 2, the reflected signal is received by the receiving antenna 12, amplified by the antenna amplifier 13, and demodulated in the mixer 14 by multiplying it with the output signal of the UHF/SHF generator 7. The demodulated signal at the outputted of the mixer 14 is filtered by the band filter 15, amplified to the required level by the amplifier 16, and detected by the amplitude detector 17.

The signal outputted from the receiver 2 is sent to the input of the processor 3 that converts this signal into a digital code and processes the converted signal as described below.

The phased antenna array 1 scans the controlled space within certain time periods during which the highly directional radiation is sent in each radiation direction only once.

Prior to operating the proposed system in a spatial scanning sector, this sector is cleaned from all metal items except those that are not threatening and are located in a stationary way. Partitioning barriers are an example of such items. During the initial (or otherwise zeroth) scanning period, the codes $A_0$ of the amplitudes of the output signals of the receiver 2 determined for each direction of radiation from the phased antenna array 1 are recorded to a memory of the processor 3.

During subsequent i-th (i>0) scanning periods, the processor 3 compares the codes $A_i$ of the amplitudes of the output signals of the receiver 2 with the code $A_0$ obtained earlier for each radiation direction and records the event of detection of a metal item if one of the conditions quoted above (1) or (2) holds.

If, for some radiation direction, one of the conditions (1) or (2) holds, the processor 3 forms the location coordinates of the detected metal item that are determined by the said radiation direction.

If none of the conditions (1) and (2) holds, no metal item is supposed to be present along the radiation direction. It is possible then that the code $A_0$ relates to a metal item that is located in the scanned sector in a stationary way and is not potentially threatening.

The video image of the entire scanning sector is sent from the video camera 5 to the processor 3. The latter references this video image to the coordinates of the detected metal item as determined from the direction of radiation along which the said item was detected and sends the combined video image to the display 4. As a result, the display 4 shows the video image of the scanning sector with the coordinates of the detected metal item superimposed on the image.

What is claimed is:

1. A method for remotely detecting potentially threatening metal items that comprises the following:
    scanning a space under surveillance with electromagnetic radiation;
    detecting metal items contained in this space based on an output signal of a receiver of reflected signals;
    employing a continuous frequency-modulated ultra high or super high frequency signal as electromagnetic radiation;
    storing, in a processor, codes of amplitudes of output signals of said receiver of reflected signals for all radiation directions during the initial scanning period when no potentially threatening metal items are allowed in a scanning sector;
    recording, in the processor, an event of detection of potentially threatening metal items during subsequent scanning periods if one of the following two comparison conditions holds for some radiation direction:

$$A_i > A_0 + \Delta \text{ or } A_i < A_0 - \Delta,$$

where
    $A_i$ is a code of an amplitude of the signal at the output of receiver of reflected signals during any scanning period after the initial one for any radiation direction;
    $A_0$ is a code of an amplitude of the signal at the output of said receiver of reflected signals during the initial scanning period for the same radiation direction for which the code $A_i$ was obtained;
    $\Delta > 0$ is a tolerance of the deviation of the code $A_0$.

2. A system for remotely detecting potentially threatening metal items, containing:
    a scanning unit for scanning a space under surveillance with electromagnetic radiation;
    a receiver of reflected signals connected to this unit;
    a processor connected to this receiver;
    a display and video camera connected to the processor;
    wherein said scanning unit is designed as a phased antenna array radiating a continuous frequency-modulated super high or ultra high frequency signal and control inputs of the array are connected to processor outputs;
    wherein said processor records to its memory codes of amplitudes of output signals of said receiver of reflected signals for all radiation directions at an initial scanning period when no potentially threatening metal items are allowed in a scanning sector and records events of detection of potentially threatening metal items during subsequent scanning periods if for some radiation direction one of the following two comparison conditions holds:

$$A_i > A_0 + \Delta \text{ or } A_i < A_0 - \Delta,$$

where
    $A_i$ is a code of an amplitude of the signal at the output of said receiver of reflected signals during any scanning period after the initial one for any radiation direction;
    $A_0$ is a code of the amplitude of the signal at the output of said receiver of reflected signals during the initial scanning period for the same radiation direction for which the code $A_i$ was obtained;
    $\Delta > 0$ is a tolerance of the deviation of the code $A_0$.

* * * * *